US011808950B2

(12) United States Patent
Xu et al.

(10) Patent No.: US 11,808,950 B2
(45) Date of Patent: Nov. 7, 2023

(54) CAMERA WITH A MULTI-MATERIAL BASE STRUCTURE (71) Applicant: Apple Inc., Cupertino, CA (US)

(72) Inventors: Bin Xu, Sunyvale, CA (US); Aurelien R. Hubert, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 85 days.

(21) Appl. No.: 17/480,045

(22) Filed: Sep. 20, 2021

(65) Prior Publication Data
US 2022/0091430 A1 Mar. 24, 2022

Related U.S. Application Data (60) Provisional application No. 63/082,998, filed on Sep. 24, 2020.

(51) Int. Cl.
G02B 27/64 (2006.01)
G02B 7/09 (2021.01)
G02B 7/02 (2021.01)
H04N 23/68 (2023.01)

(52) U.S. Cl.
CPC .......... *G02B 27/646* (2013.01); *G02B 7/021* (2013.01); *G02B 7/09* (2013.01); *H04N 23/687* (2023.01); *G03B 2205/0007* (2013.01); *G03B 2205/0069* (2013.01)

(58) Field of Classification Search
CPC ...... G02B 27/646; G02B 7/021; G02B 7/023; G02B 7/09; G03B 2205/0007; G03B 2205/0069; H04N 23/55; H04N 23/57; H04N 23/687
See application file for complete search history.

(56) References Cited

U.S. PATENT DOCUMENTS

| 9,423,631 | B2 * | 8/2016 | Cho | H04N 23/55 |
| 9,618,768 | B2 * | 4/2017 | Yeo | G03B 5/00 |
| 9,915,801 | B2 * | 3/2018 | Kang | G02B 7/04 |
| 2019/0250366 | A1 * | 8/2019 | Howarth | G03B 3/10 |
| 2019/0346740 | A1 | 11/2019 | Suh et al. | |
| 2020/0286933 | A1 * | 9/2020 | Tanaka | H01L 27/14625 |

FOREIGN PATENT DOCUMENTS

| JP | 2015141276 A | 8/2015 |
| JP | 2021028657 A | 2/2021 |
| WO | 200856534 | 5/2008 |

* cited by examiner

*Primary Examiner* — Antoinette T Spinks
(74) *Attorney, Agent, or Firm* — Robert C. Kowert; Kowert, Hood, Munyon, Rankin & Goetzel, P.C.

(57) ABSTRACT

A camera may include a multi-material base structure having at least a first portion and a second portion. The first and second portions of the base structure may include different materials. The base structure may be used with one or more actuators of the camera to implement various optical image stabilization (OIS) and/or autofocus (AF) functions.

20 Claims, 6 Drawing Sheets

CAMERA WITH A MULTI-MATERIAL BASE STRUCTURE

This application claims benefit of priority to U.S. Provisional Application Ser. No. 63/082,998, entitled "Camera with a Multi-Shot Base Structure," filed Sep. 24, 2020, and which is hereby incorporated herein by reference in its entirety.

BACKGROUND

Technical Field

This disclosure relates generally to a camera and more specifically to a camera having a multi-material base structure.

DESCRIPTION OF THE RELATED ART

The advent of mobile multipurpose devices such as smartphones, tablet or pad devices has resulted in a need for bigger lenses such as ultra- or super-wide lenses for integration in cameras of the devices. Some cameras may incorporate optical image stabilization (OIS) mechanisms that may sense and react to external excitation/disturbance by adjusting location of the image sensor relative to the lenses in an attempt to compensate for unwanted motion of the lenses. Furthermore, some cameras may incorporate an autofocus (AF) mechanism whereby the object focal distance can be adjusted to focus an object plane in front of the camera at an image plane to be captured by the image sensor. In some such AF mechanisms, the optical lenses are moved as a single rigid body along the optical axis of the camera to refocus the camera.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to a camera having a multi-material base structure. For example, the base structure may have a first portion (e.g., an outer portion) formed of at least a first material, and a second portion (e.g., an inner portion) formed of at least a second material that is different than the first material. The first material and the second material may be different in terms of their respective material properties in various embodiments. In some embodiments, the base structure may include at least two portions formed separately using a multi-shot injection molding process. In such cases, the first portion may be referred to as a "first shot portion" and/or an "outer shot portion," and the second portion may be referred to as "second shot portion" and/or an "inner shot portion". In various embodiments, the base structure may include a first shot portion (e.g., an outer shot portion), formed of at least one material having relatively low shrinkage, and a second shot portion (e.g., an inner shot portion), formed of at least one material having relatively high tensile strength.

In some embodiments, the base structure may be used as a support structure for an actuator of the camera to implement various optical image stabilization (OIS) and/or autofocus (AF) functions. For instance, in some embodiments, the camera may include a flexure suspension arrangement having a dynamic platform, a stationary platform, and one or more flexure arms. In some embodiments, the dynamic platform may form an inner frame, whilst the stationary platform may form an outer frame. In some embodiments, the camera may include an actuator having a movable frame, to which an image sensor may be attached. In some embodiments, the movable frame may be fixedly coupled with the dynamic platform of the flexure suspension arrangement. In some embodiments, the inner (dynamic) platform may be flexibly coupled with the outer (stationary) platform via the one or more flexure arms. In some embodiments, the stationary platform may be fixedly coupled with the outer portion of the base structure, whilst the movable frame may reside inside the inner portion of the base structure. Therefore, the inner portion may encircle the movable frame, and the base structure may accordingly become an end stop—e.g., defining a boundary—with respect to motion of the movable frame (and the dynamic platform). In some embodiments, the actuator may move the movable frame (together with the image sensor) relative to the lens group within the boundary of the inner portion of the base structure to implement various OIS functions. In some embodiments, the movable frame may be fixedly attached with the lens group, and the camera may similarly use the base structure as support foundation and end stop to move the lens group relative to the image sensor to perform various AF functions. In some embodiments, the camera including the multi-material base structure disclosed herein may be integrated in mobile multipurpose devices such as smartphones, tablet or pad devices.

The disclosed base structure provides at least several benefits. As described above, the base structure may use different types of materials to form the first (e.g., outer) and second (e.g., inner) portions. For instance, when the base structure is formed using a multi-shot injection molding process, the inner shot portion may use at least one material having relatively high tensile strength. In some embodiments, because the inner shot portion serves as the interface with the movable frame, any contact between the inner shot portion and the movable frame would not easily cause damages (e.g., deformation, crack, or chip-away) to the base structure. Meanwhile, because the outer shot portion may use at least one material having relatively low shrinkage, the base structure can still have the required stiffness to maintain overall physical form (e.g., flatness). In addition, the multi-material arrangement (and/or multi-shot arrangement) of the base structure provides more design and/or repair flexibilities. For instance, a multi-shot base structure may be used to accommodate various movable frames, e.g., by only exchanging the inner shot portion. Thus, only mold(s) for the inner shot portion need to be re-tooled and the inner shot portion to be re-formed, whilst the outer shot portion can still be re-used.

Figures 1A, 1B:
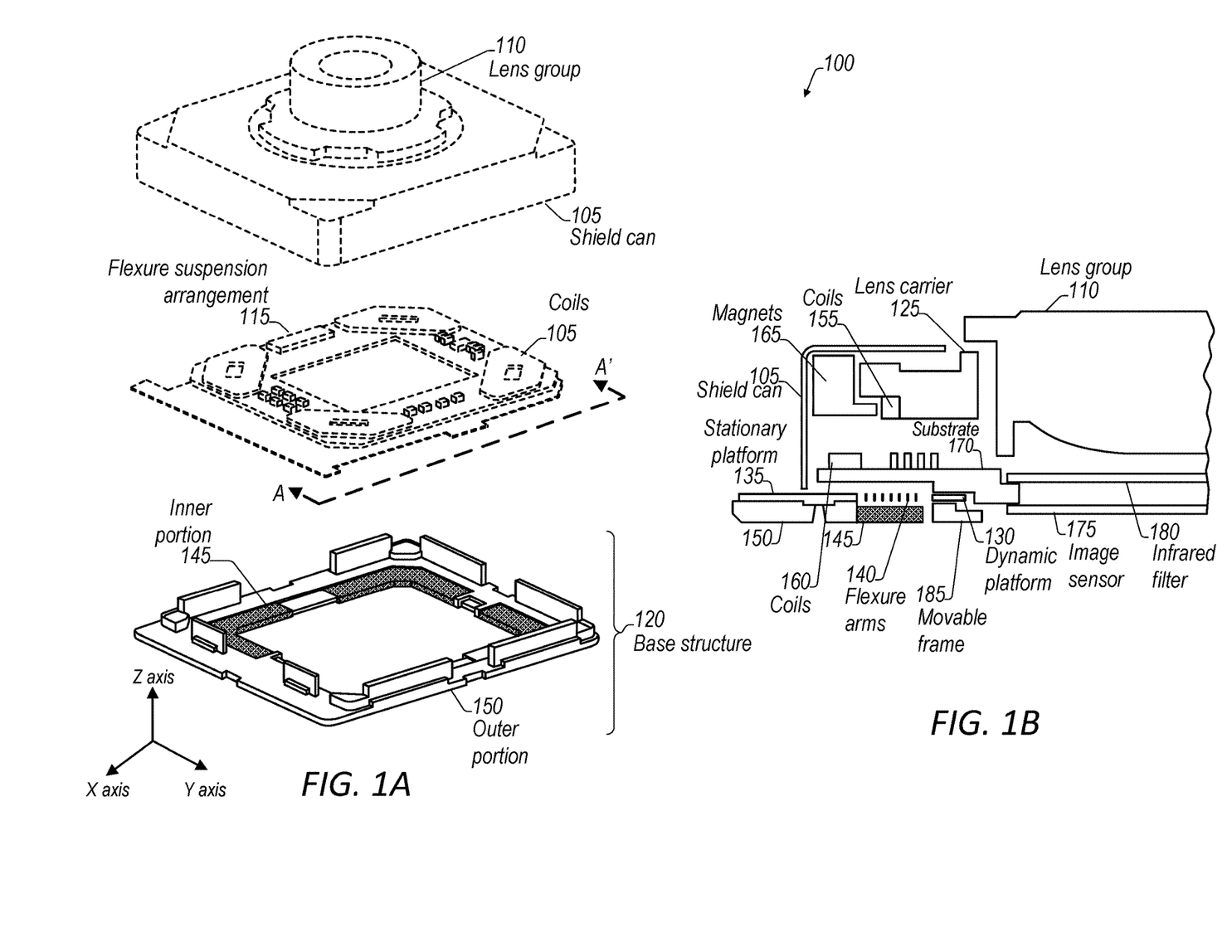
FIGS. 1A-1B shows an example camera including a multi-material base structure, according to some embodiments.
Figure 2:
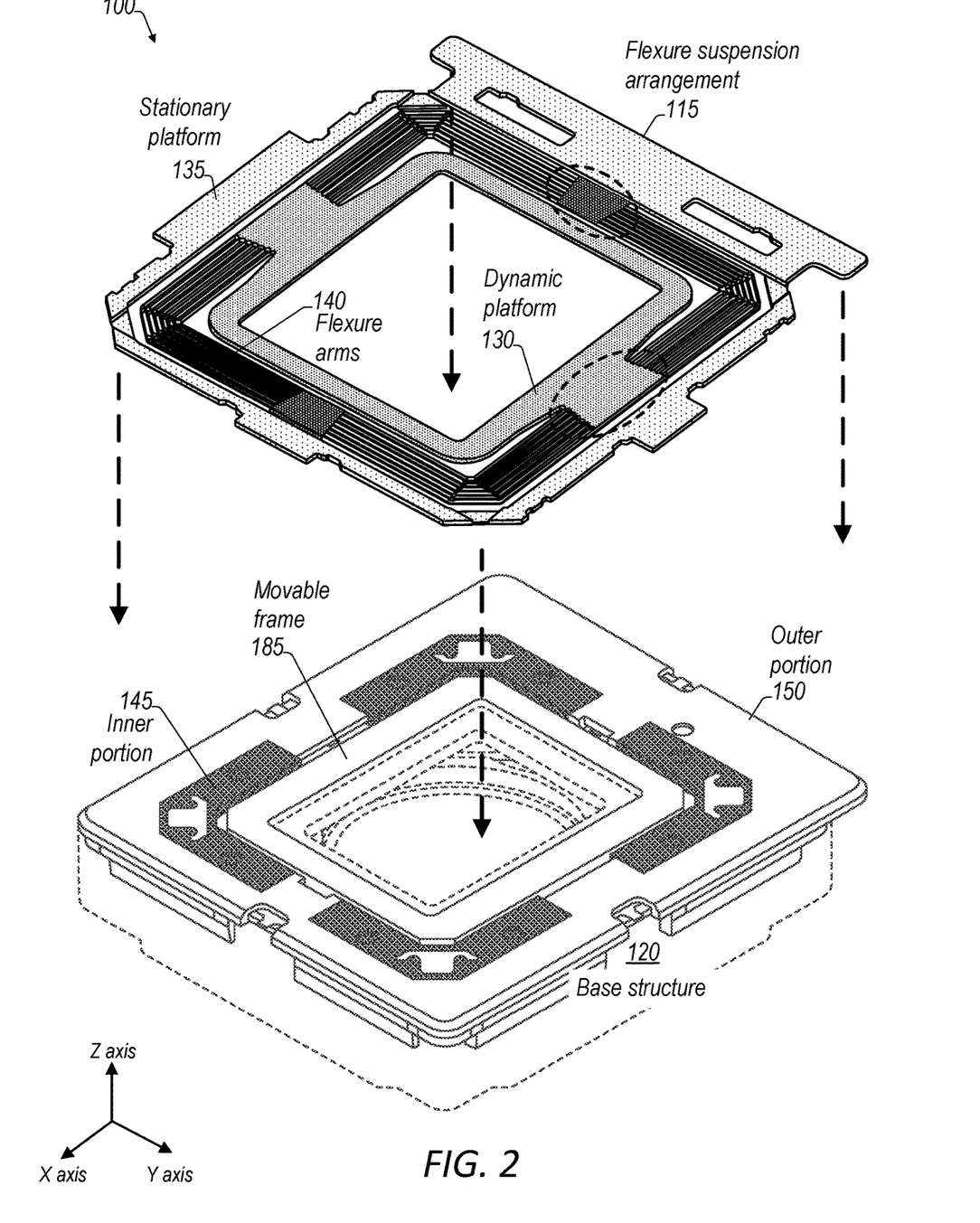
FIG. 2 shows example multi-material base structure and flexure suspension arrangement of a camera, according to some embodiments.

FIGS. 1A-1B shows an example camera including a multi-material base structure, according to some embodiments. FIG. 1A shows an exterior, perspective view of camera 100, whilst FIG. 2B shows an interior, cross-sectional view of (half of) camera 100 in the direction of A-A' as indicated in FIG. 1A. For purposes of illustration, in this example, camera 100 may use base structure 120 to implement various OIS functions. To simplify explanations, FIGS. 1A-1B will be described herein together with reference to each other. As shown in FIGS. 1A-1B, camera 100 may include shield can 105, lens group 110, flexure suspension arrangement 115, and base structure 120. In some embodiments, lens group 110 may include one or more lens elements (not shown), which may be fixedly coupled with lens carrier 125. For instance, lens carrier 125 may include interior threads such that the one or more lens elements may be screwed in to lens carrier 125 from inside via the threads. In some embodiments, flexure suspension arrangement 115 (also shown in FIG. 2) may include dynamic platform 130, stationary platform 135, two of which may be flexibly coupled with each other via one or more flexure arms 140. In this example, dynamic platform 130 may be arranged inside stationary platform 135, and flexure arms 140 may be arranged to surround a perimeter of dynamic platform 130 in-between dynamic platform 130 and stationary platform 135 for connecting dynamic platform 130 with stationary platform 135. Thus, flexure arms 140 may suspend dynamic platform 130 from stationary platform 135, thus providing movability for dynamic platform 130 relative to stationary platform 135. In some embodiments, base structure 120 (also shown in FIGS. 2-3) may include at least an inner portion 145 and an outer portion 150, two of which may be formed of different materials. In some embodiments, a multi-shot injection molding process may be used to form the base structure (e.g., a dual-shot base structure), e.g., by forming an inner shot portion and an outer shot portion in respective shots in the multi-shot injection molding process. In some embodiments, inner portion 145 and outer portion 150 may use different materials. For instance, inner portion 145 may include at least a first material having relatively high tensile strength, whilst outer portion 150 may include at least a second material having relatively low shrinkage. In some non-limiting examples, the first material has a tensile strength at least 20% higher than the tensile strength of the second material. Additionally, or alternatively, the second material may have a shrinkage at least 200% lower than the shrinkage of the first material in some non-limiting examples. In some embodiments, the materials used to form inner and outer portions 145 and 150 may include liquid crystal polymer (LDP), polyamide (PA), polyphenylene sulfide (PPS), and the like.

As shown in FIG. 1B, in some embodiments, camera 100 may include an AF actuator having one or more coils 155 and/or an OIS actuator having one or more coils 160, two of which may share one or more magnets 165. In some embodiments, coils 155 may be fixedly coupled with lens carrier 125 (and lens group 110), coils 160 may be fixedly coupled with movable frame 185, and magnets may be fixedly coupled with shield can 105. In some embodiments, movable frame 185 may be part of substrate 170. In some embodiments, movable frame 185 may be separate from but fixedly attached to substrate 170. In some embodiments, camera 100 may include image sensor 175 and optionally infrared filter 180. In some embodiments, image sensor 175 and/or infrared filter 180 may be, directly or indirectly, attached to (and thus fixedly coupled with) substrate 170 (e.g., using socket and/or soldering). Optically, light may pass through lens group and then focus on to an image plane at image sensor 175 for image sensor 175 to capture image data based on the light. When camera 100 includes infrared filter 180, infrared filter 180 may filter or block at least some infrared light from reaching image sensor 175. As shown in FIG. 1B, coils 145 (which may be fixedly coupled with lens group 110) of the AF actuator may be placed proximate magnets 155 (which may be fixedly coupled with shield can 105). Therefore, the current flowing through coils 145 may interact with magnetic fields of magnets 155 to generate motive force (e.g., Lorentz force). In some embodiments, the AF actuator may regulate the current of coils 145 to control the motive force to move lens group 110 relative to magnets 155 (and thus shield can 105 and image sensor 175), e.g., approximately along Z-axis—thus implementing the AF functions.

Referring back to FIG. 1B, in some embodiments, stationary platform 135 of flexure suspension arrangement 115 may be fixedly coupled with outer portion 150 of base structure 115, whilst dynamic platform 130 of flexure suspension arrangement 115 may reside spatially inside inner portion 145 of base structure 115. In some embodiments, dynamic platform 130 may be fixedly coupled with movable frame 185 and substrate 170 (and image sensor 175). Therefore, shot portion 145 may encircle movable frame 185, such that base structure 115 may define an end stop with respect to motion of movable platform 185 (and thus substrate 170 with attached image sensor 175). As shown in FIG. 1B, coils 160 of the OIS actuator may be arranged proximate magnets 165. Thus, the OIS actuator may regulate the current of coils 160 to generate motive force (e.g., Lorentz force) to move substrate 170 (together with image sensor 175) relative to magnets 165 and thus lens group 110 within the boundary defined by base structure 120, e.g., approximately along X-axis and/or Y-axis—thus implementing various OIS functions.

FIG. 2 shows details of multi-material base structure and flexure suspension arrangement of camera 100, according to some embodiments. As shown in FIG. 2, flexure suspension arrangement 115 of camera 100 may include dynamic platform 130, stationary platform 135, and one or more flexure arms 140. In some embodiments, dynamic platform 130 may be flexibly coupled with stationary platform 135 via one or more flexure arms 140. For instance, as indicated by the dashed circles, flexure arms 140 may connect to dynamic platform 130 and stationary platform 135 at their respective "protruding" pads. Because flexure arms 140 may possess mechanical flexibility, this arrangement of flexure suspension arrangement 115 may allow dynamic platform 130 to move relative to stationary platform 135, e.g., along X-axis and/or Y-axis.

Referring back to FIG. 2, base structure 120 of camera 100 may include inner portion 145 and outer portion 150. As described above in FIGS. 1A-1B, in some embodiments camera 100 may include flexure suspension arrangement 115 having dynamic platform 130, stationery platform 135, and one or more flexure arms 140. In some embodiments, an image sensor (not shown) of the camera may be attached to dynamic platform 130. In some embodiments, dynamic platform 130 (and the image sensor) may be fixedly coupled with movable frame 185. FIG. 2 shows flexure suspension arrangement 115 above base structure 120, prior to an assembly of the two components. As indicated in FIG. 2, after assembly, inner portion 145 may encircle movable frame 185, and thus base structure 120 may define an end stop with respect to motion of movable frame 185 (and thus dynamic platform 130 and image sensor). Because inner portion 145 may include at least one material having relatively high tensile strength, inner portion 145, as an interface between base structure 120 and the movable frame, can provide better mechanical protection for base structure 100 from damages caused by the motion and contact with the movable frame of camera 100.

Note that, for purposes of illustration, FIGS. 1-2 show a multi-material base structure used for OIS functions. In some embodiments, a multi-material base structure disclosed herein may be used to implement other motion functions in a camera, e.g., various AF functions. For instance, a camera may include an AF actuator having a movable frame, where the movable frame may be fixed coupled with a lens group of the camera. In some embodiments, an inner portion of the base structure may encircle the movable frame to thus define an end stop with respect to the motion of the movable frame and the lens group. In addition, for purposes of illustration, FIGS. 1-2 show that the inner portion of the base structure may serve as an interface with the movable frame. In some embodiments, the outer portion of the base structure may instead be used as an interface with a movable frame, whilst the inner portion may become an interface with stationary component(s) of the camera. In that case, the materials for the inner and outer portions of the base structure may be adjusted. For instance, the outer portion may use at least one material having relatively high tensile strength, whilst the inner portion may use at least one material having relatively low shrinkage. Moreover, for purposes of illustration, FIGS. 1-2 show that the two portions of the base structure may be arranged horizontally as inner and outer portions. In some embodiments, the two portions of the base structure may be arranged in other alternative structures, e.g., vertically a top portion and a bottom portion, and so on.

Figure 3:
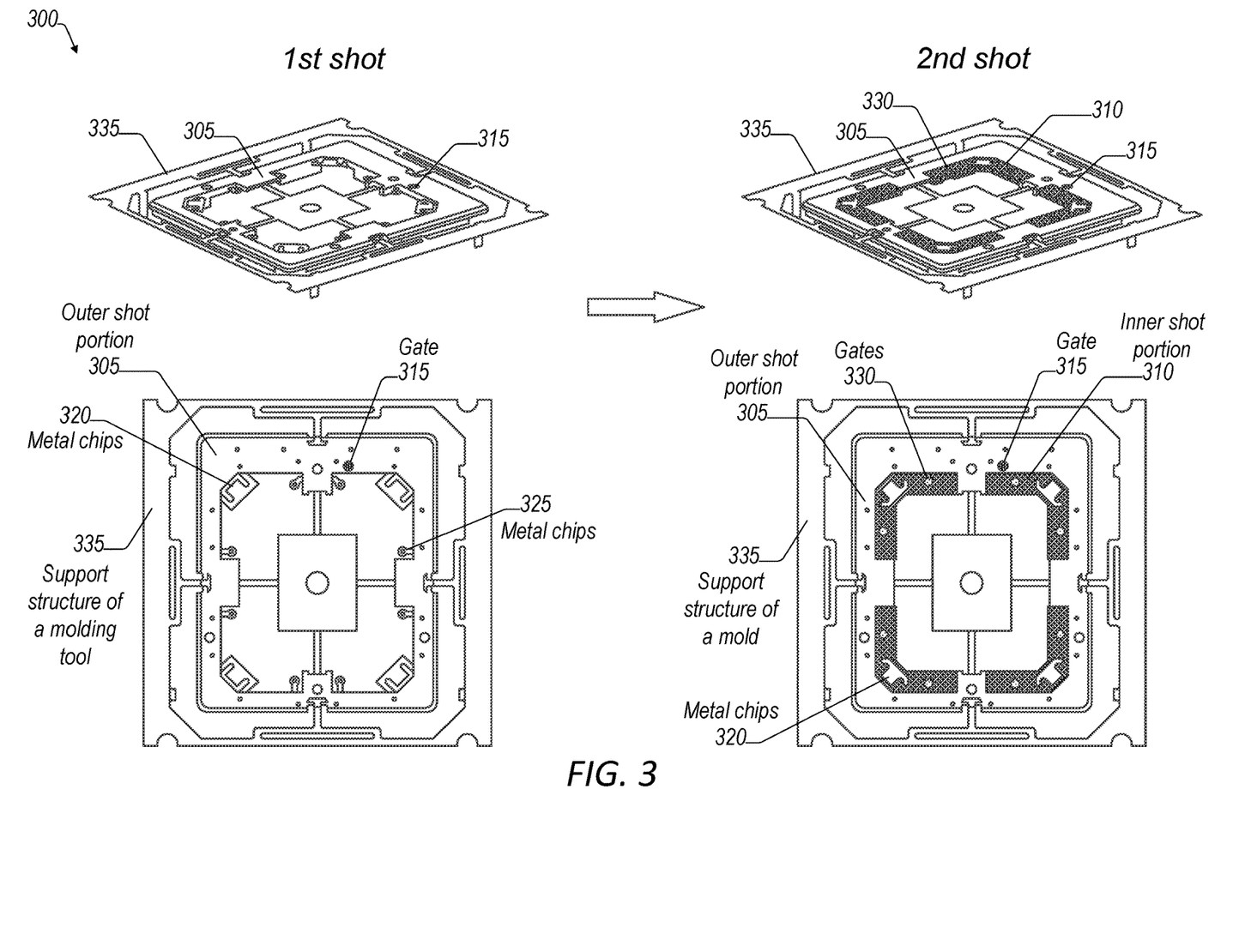
FIG. 3 shows an example of using a multi-shot injection molding process to form a multi-material base structure (also referred to as a "multi-shot base structure" in some examples) of a camera, according to some embodiments.

FIG. 3 shows an example of using a multi-shot injection molding process to form a multi-material base structure (also referred to herein as a "multi-shot base structure") of a camera, according to some embodiments. In some embodiments, base structure 300 may be formed in a multi-material injection molding process. In some embodiments, the process may include a first shot session to form a first (e.g., outer) shot portion 305 of base structure 300. In some embodiments, outer shot portion 305 may be formed using at least one a first material having relative low shrinkage. For instance, pellets (or granulates) of the first material may be fed in to an injection molding machine. The injection molding machine may melt the pellets (or granulates) and inject the melted material through a first set of openings (as indicated by gate 315) in to the empty or cavity part (also called cavity image) of a mold held by a molding tool including support structure 335. In this example, the first set of openings may include one single gate 315. The mold cavity of the mold may define physical shape and structure of outer shot portion 305. When the melted material cools down and solidifies inside the mold cavity, it may form outer shot portion 305. In some embodiments, one or more metal chips 320 and/or 325 in various shapes and/or sizes may be attached to outer shot portion 305 at various positions during the first shot session. In some embodiments, metal chips 320 and/or 325 may serve as an electrical ground, e.g., for current conduction, power delivery, and/or electrostatic discharge.

Referring back to FIG. 3, in some embodiments, the multi-shot injection molding process may include a second shot session to form a second (e.g., inner) shot short portion 310 of base structure 300. In some embodiments, inner shot portion 310 may be formed using at least a second material having relatively high tensile strength. The second session may be performed in a similar way as the first session, except that the second session may require a different mold for inner shot portion 310. In this example, inner shot portion 310 may be formed inside outer shot portion 305 such that outer shot portion 305 may encircle inner shot portion 310, as shown in FIG. 3. In this example, the second session may inject the melted second material through a second set of openings (as indicated by gates 330) into the mold to form inner shot portion 310. In this example, the second set of openings may include eight gates 330. After the second shot session, base structure 300 may be ejected from the mold, and support structure 335 may be removed (e.g., cut away). Note that the molds used to form outer shot portion 305 and 310 may be separate molds or alternatively separate parts of one single molds. In addition, for purposes of illustration, FIG. 3 shows to form outer shot portion 305 first and inner shot portion 310 next. In some embodiments, the order of the multi-shot injection folding process may be different, e.g., an inner shot portion may be formed first and an outer shot portion next, or alternatively, the two portions may be formed separately but in parallel at approximately the same time.

Figure 4:
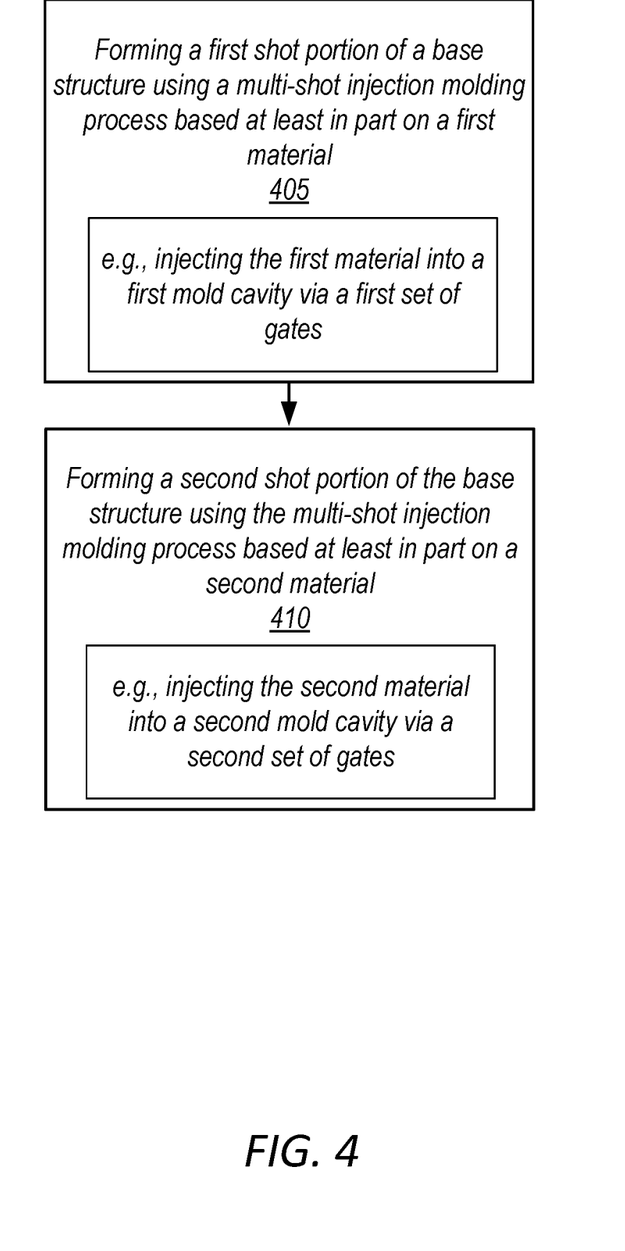
FIG. 4 shows an example high-level flowchart for a method to form a multi-shot base structure of a camera, according to some embodiments.

FIG. 4 shows an example high-level flowchart for a method to form a multi-shot base structure of a camera, according to some embodiments. In some embodiments, the method may include forming a first shot portion of a base structure using a multi-shot injection molding process based at least in part on a first material, as indicated in block 405. In some embodiments, the first shot portion of the base structure (e.g., base structure 100 and 300 in FIGS. 1-3) may be an outer shot portion (e.g., outer portion 150 and outer shot portion 305 in FIGS. 1-3). In some embodiments, formation of the first shot portion may include injecting the first material into a first mold cavity via a first set of gates (e.g., gate 315 in FIG. 3). In some embodiments, the first shot portion may be formed using at least one material having relatively low shrinkage.

Referring back to FIG. 4, in some embodiments, the method may further include forming a second shot portion of the base structure using the multi-shot injection molding process based at least in part on a second material, as indicated in block 410. In some embodiments, the second shot portion of the base material may be an inner shot portion (e.g., inner portion 145 and inner shot portion 310 in FIGS. 1-3). In some embodiments, formation of the second shot portion may include injecting the second material into a second mold cavity via a second set of gates (e.g., gates 330 in FIG. 3). In some embodiments, the second shot portion may be formed using at least one material having relatively high tensile strength. In some embodiments, the second shot portion may be placed spatially inside the inner shot portion such that the second shot portion may encircle the first shot portion. In some embodiments, the base structure may be used as a support foundation to define an end stop with respect motion of a movable frame of the camera. For instance, the movable frame may be attached to a suspension arrangement (e.g., flexure suspension arrangement 115 in FIGS. 1-2) including both a stationary platform and a dynamic platform. In some embodiments, the dynamic platform itself may form the movable frame. In another example, the dynamic platform may be separate from and fixed coupled with the movable frame. In some embodiments, the movable frame may be fixedly coupled with an image sensor or a lens group of the camera. In some embodiments, the stationary platform may be attached with the first shot portion of the base structure, whilst the dynamic platform may be positioned such that the movable frame may be encircled by the second shot portion of the base structure. Therefore, the base structure may effectively define a boundary for the motion of the movable frame of the camera.

Figure 5:
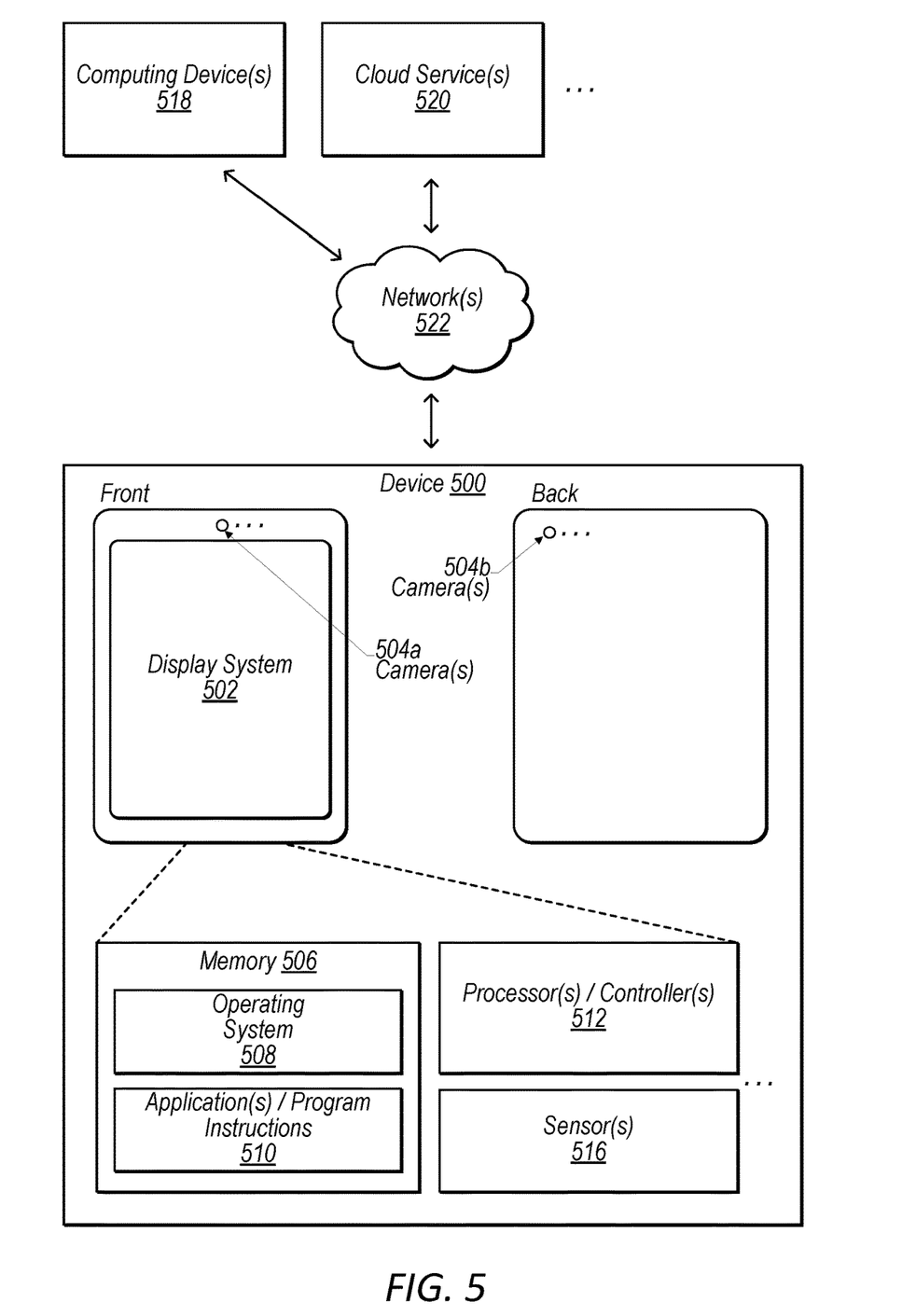
FIG. 5 shows a schematic representation of an example device 500 that may include a camera having a multi-material base structure, according to some embodiments.

FIG. 5 illustrates a schematic representation of an example device 500 that may include a camera having a multi-material base structure, e.g., as described herein with reference to FIGS. 1-4, according to some embodiments. In some embodiments, the device 500 may be a mobile device and/or a multifunction device. In various embodiments, the device 500 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 500 may include a display system 502 (e.g., comprising a display and/or a touch-sensitive surface) and/or one or more cameras 504. In some non-limiting embodiments, the display system 502 and/or one or more front-facing cameras 504a may be provided at a front side of the device 500, e.g., as indicated in FIG. 5. Additionally, or alternatively, one or more rear-facing cameras 504b may be provided at a rear side of the device 500. In some embodiments comprising multiple cameras 504, some or all of the cameras may be the same as, or similar to, each other. Additionally, or alternatively, some or all of the cameras may be different from each other. In various embodiments, the location(s) and/or arrangement(s) of the camera(s) 504 may be different than those indicated in FIG. 5.

Among other things, the device 500 may include memory 506 (e.g., comprising an operating system 508 and/or application(s)/program instructions 510), one or more processors and/or controllers 512 (e.g., comprising CPU(s), memory controller(s), display controller(s), and/or camera controller(s), etc.), and/or one or more sensors 516 (e.g., orientation sensor(s), proximity sensor(s), and/or position sensor(s), etc.). In some embodiments, the device 500 may communicate with one or more other devices and/or services, such as computing device(s) 518, cloud service(s) 520, etc., via one or more networks 522. For example, the device 500 may include a network interface (e.g., network interface 610) that enables the device 500 to transmit data to, and receive data from, the network(s) 522. Additionally, or alternatively, the device 500 may be capable of communicating with other devices via wireless communication using any of a variety of communications standards, protocols, and/or technologies.

Figure 6:
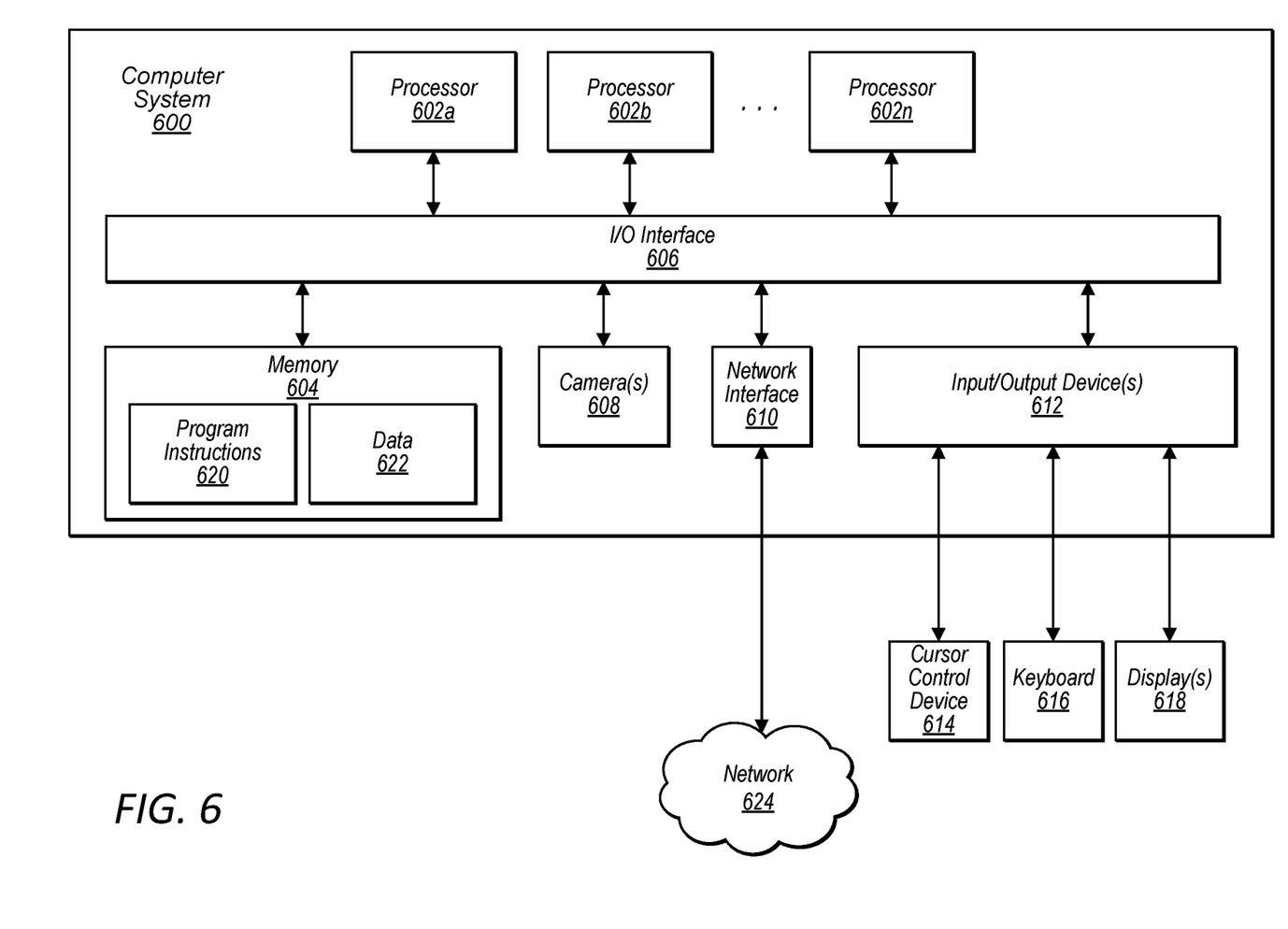
FIG. 6 shows a schematic block diagram of an example computer system that may include a camera having a multi-material base structure, according to some embodiments.

FIG. 6 illustrates a schematic block diagram of an example computing device, referred to as computer system 600, that may include or host embodiments of a camera having a multi-material base structure, e.g., as described herein with reference to FIGS. 1-5, according to some embodiments. In addition, computer system 600 may implement methods for controlling operations of the camera and/or for performing image processing images captured with the camera. In some embodiments, the device 500 (described herein with reference to FIG. 5) may additionally, or alternatively, include some or all of the functional components of the computer system 600 described herein.

The computer system 600 may be configured to execute any or all of the embodiments described above. In different embodiments, computer system 600 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 600 includes one or more processors 602 coupled to a system memory 604 via an input/output (I/O) interface 606. Computer system 600 further includes one or more cameras 608 coupled to the I/O interface 606. Computer system 600 further includes a network interface 610 coupled to I/O interface 606, and one or more input/output devices 612, such as cursor control device 614, keyboard 616, and display(s) 618. In some cases, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 602, or a multiprocessor system including several processors 602 (e.g., two, four, eight, or another suitable number). Processors 602 may be any suitable processor capable of executing instructions. For example, in various embodiments processors 602 may be general-purpose or embedded processors implementing any of a variety of instruction set architectures (ISAs), such as the x86, PowerPC, SPARC, or MIPS ISAs, or any other suitable ISA. In multiprocessor systems, each of processors 602 may commonly, but not necessarily, implement the same ISA.

System memory 604 may be configured to store program instructions 620 accessible by processor 602. In various embodiments, system memory 604 may be implemented using any suitable memory technology, such as static random access memory (SRAM), synchronous dynamic RAM (SDRAM), nonvolatile/Flash-type memory, or any other type of memory. Additionally, existing camera control data 622 of memory 604 may include any of the information or data structures described above. In some embodiments, program instructions 620 and/or data 622 may be received, sent or stored upon different types of computer-accessible media or on similar media separate from system memory 604 or computer system 600. In various embodiments, some or all of the functionality described herein may be implemented via such a computer system 600.

In one embodiment, I/O interface 606 may be configured to coordinate I/O traffic between processor 602, system memory 604, and any peripheral devices in the device, including network interface 610 or other peripheral interfaces, such as input/output devices 612. In some embodiments, I/O interface 606 may perform any necessary protocol, timing or other data transformations to convert data signals from one component (e.g., system memory 604) into a format suitable for use by another component (e.g., processor 602). In some embodiments, I/O interface 606 may include support for devices attached through various types of peripheral buses, such as a variant of the Peripheral Component Interconnect (PCI) bus standard or the Universal Serial Bus (USB) standard, for example. In some embodiments, the function of I/O interface 606 may be split into two or more separate components, such as a north bridge and a south bridge, for example. Also, in some embodiments some or all of the functionality of I/O interface 606, such as an interface to system memory 604, may be incorporated directly into processor 602.

Network interface 610 may be configured to allow data to be exchanged between computer system 600 and other devices attached to a network 624 (e.g., carrier or agent devices) or between nodes of computer system 600. Network 624 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 610 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 612 may, in some embodiments, include one or more display terminals, keyboards, keypads, touchpads, scanning devices, voice or optical recognition devices, or any other devices suitable for entering or accessing data by one or more computer systems 600. Multiple input/output devices 612 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 610.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
a lens group comprising one or more lens elements;
an image sensor to capture image data based on light that passes through the lens group;
a movable frame fixedly coupled with the lens group or the image sensor;
an actuator for moving the movable frame; and
a base structure that defines an end stop with respect to motion of the movable frame in one or more directions, wherein the base structure comprises:
an inner portion formed of a first material, wherein the inner portion at least partially encircles the movable frame; and
an outer portion formed of a second material that is different than the first material, wherein the outer portion at least partially encircles the inner portion.

2. The camera of claim 1, wherein the first material has a higher tensile strength than the second material.

3. The camera of claim 1, wherein:
the movable frame is fixedly coupled with the image sensor; and
the actuator is configured to move the movable frame, together with the image sensor, relative to the lens group.

4. The camera of claim 3, wherein:
the lens group defines an optical axis; and
the actuator is configured to move the movable frame in one or more directions orthogonal to the optical axis, to provide optical image stabilization (OIS) movement of an image on the image sensor.

5. The camera of claim 4, wherein:
the movable frame comprises a substrate to which the image sensor is attached; and
the camera further comprises:
a flexure suspension arrangement for suspending the substrate from the base structure, the flexure suspension arrangement comprising:
a dynamic platform fixedly coupled with the substrate;
a stationary platform coupled with the base structure; and
one or more flexure arms that connect the dynamic platform to the stationary platform and that allow the dynamic platform to move, in the one or more directions orthogonal to the optical axis, relative to the stationary platform.

6. The camera of claim 1, wherein:
the inner portion is formed in a respective shot, in a multi-shot injection molding process, that occurs after a respective shot in which the outer portion is formed.

7. The camera of claim 6, wherein:
the first material has a higher tensile strength than the second material; and
the second material has a lower shrinkage than the first material.

8. A device, comprising:
one or more processors;
memory storing program instructions executable by the one or more processors to control operations of a camera; and
the camera, comprising:
a lens group comprising one or more lens elements;

an image sensor to capture image data based on light that passes through the lens group;
a movable frame fixedly coupled with the lens group or the image sensor;
an actuator for moving the movable frame;
a base structure that defines an end stop with respect to motion of the movable frame in one or more directions, wherein the base structure comprises:
an inner portion formed of a first material, wherein the inner portion at least partially encircles the movable frame; and
an outer portion formed of a second material that is different than the first material, wherein the outer portion at least partially encircles the inner portion.

9. The device of claim 8, wherein the first material has a higher tensile strength than the second material.

10. The device of claim 9, wherein:
the lens group defines an optical axis;
the movable frame is fixedly coupled with the image sensor; and
the actuator is configured to move the movable frame, together with the image sensor, in one or more directions orthogonal to the optical axis.

11. The device of claim 10, wherein:
the movable frame comprises a substrate to which the image sensor is attached; and
the camera further comprises:
a flexure suspension arrangement for suspending the substrate from the base structure, the flexure suspension arrangement comprising:
a dynamic platform fixedly coupled with the substrate;
a stationary platform coupled with the base structure; and
one or more flexure arms that connect the dynamic platform to the stationary platform and that allow the dynamic platform to move, in the one or more directions orthogonal.

12. The device of claim 8, wherein:
the inner portion is formed in a respective shot, in a multi-shot injection molding process, that occurs after a respective shot in which the outer portion is formed;
the first material has a higher tensile strength than the second material; and
the second material has a lower shrinkage than the first material.

13. The device of claim 8, wherein:
the base structure comprises:
a first side that faces, in a direction parallel to an optical axis defined by the lens group, towards the lens group; and
a second side that faces opposite the first side, wherein the inner portion abuts the outer portion such that the second side comprises a flat outer surface formed of the first material and the second material.

14. The device of claim 8, wherein the base structure further comprises:
one or more conductive elements that are insert molded in a multi-shot injection molding process that is used to form the inner portion and the outer portion.

15. The device of claim 14, wherein the one or more conductive elements are insert molded together with the inner portion.

16. The device of claim 14, wherein the camera further comprises:
a conductive enclosure that encases at least a portion of the camera;
wherein:
the movable frame is fixedly coupled with an image sensor package comprising one or more electrical components; and
the one or more conductive elements form a portion of an electrical ground path between image sensor package and the conductive enclosure.

17. The device of claim 8, wherein the actuator comprises a voice coil motor (VCM) actuator.

18. The device of claim 8, wherein:
the first material has a higher tensile strength than the second material; and
the second material has a lower shrinkage than the first material.

19. A method, comprising:
forming, using a multi-shot injection molding process, a base structure of a camera, wherein the base structure is configured to define an end stop with respect to motion of a movable frame of the camera in one or more directions, wherein the camera includes an actuator to move the movable frame in the one or more directions, and wherein the forming the base structure comprises:
forming an inner shot portion and an outer shot portion in respective shots of the multi-shot injection molding process, wherein:
the inner shot portion is configured to at least partially encircle the movable frame and is formed of a first material; and
the outer shot portion is configured to at least partially encircle the inner shot portion and is formed of a second material that is different than the first material.

20. The method of claim 19, wherein the forming the inner shot portion and the outer shot portion comprises:
injecting the second material into an outer shot mold cavity via a first set of one or more gates; and
injecting the first material into an inner shot mold cavity via a second set of gates, wherein the second set of gates comprises a greater number of gates than the first set of one or more gates.

* * * * *